June 25, 1957 H. U. GARRETT ET AL 2,796,885
DIFFERENTIAL PISTON TYPE RELIEF VALVE
Filed April 14, 1951 3 Sheets-Sheet 1
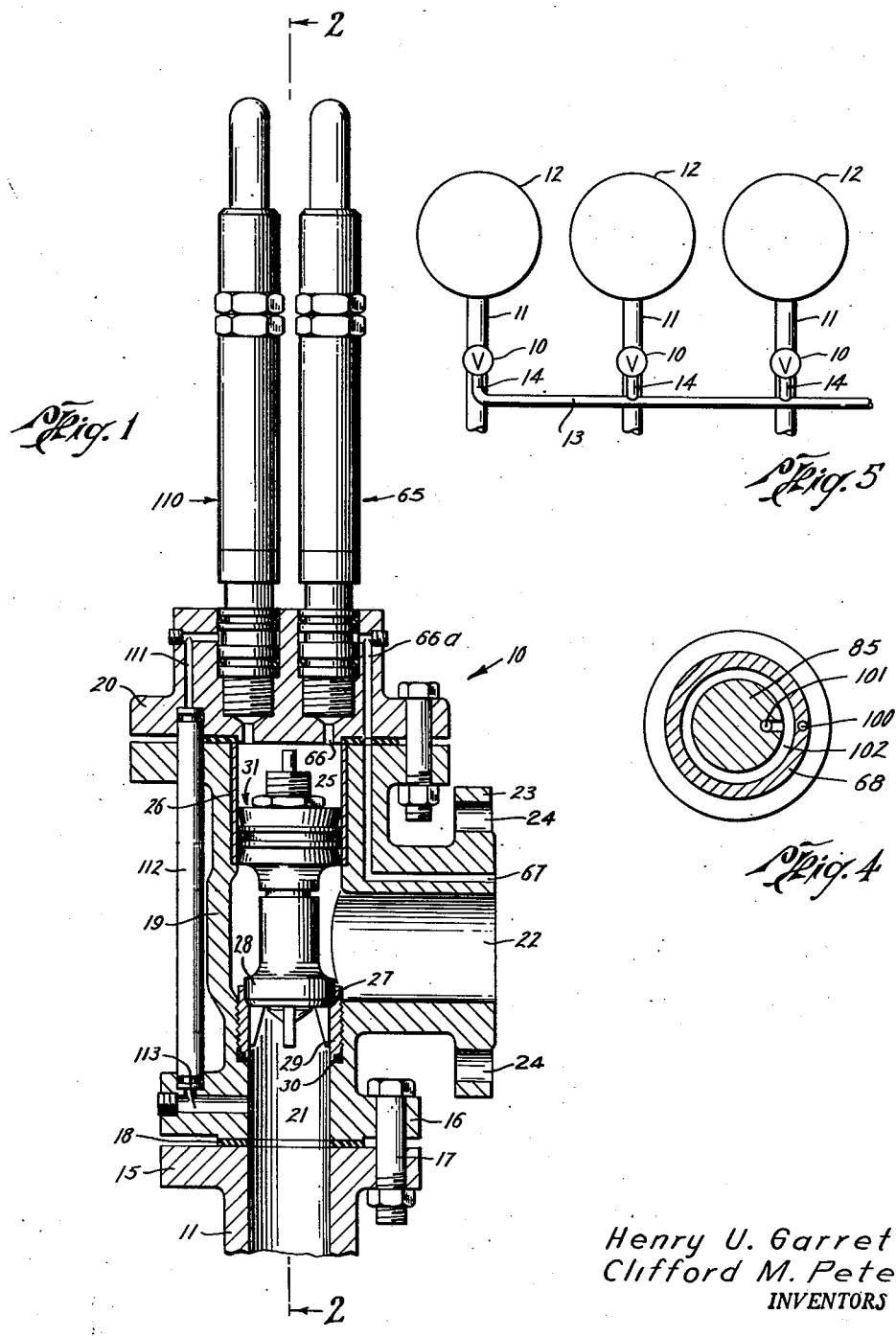
Henry U. Garrett
Clifford M. Peters
INVENTORS
BY Browning & Simms
ATTORNEYS Henry U. Garrett
Clifford M. Peters
INVENTORS

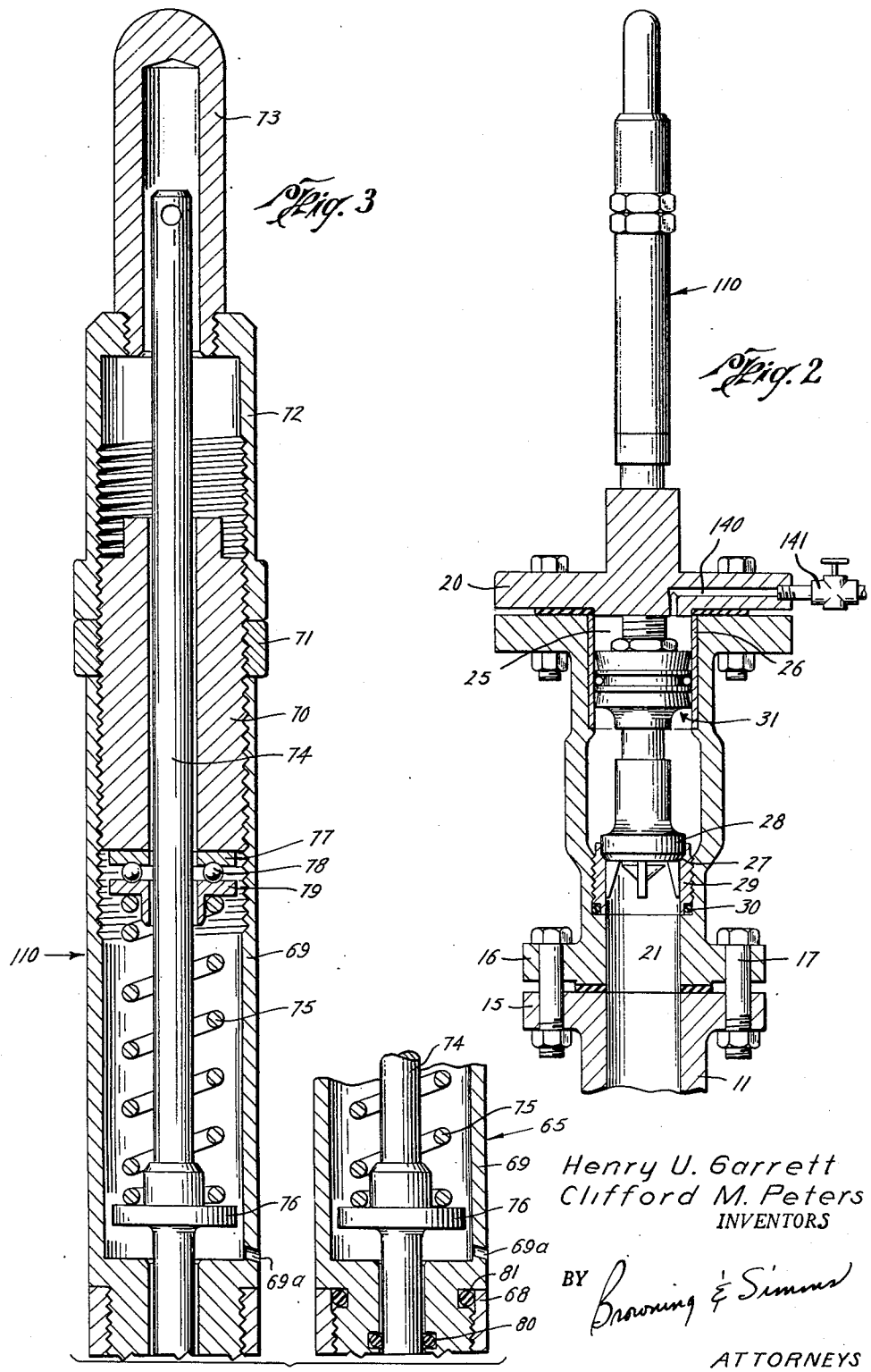

United States Patent Office 2,796,885
Patented June 25, 1957

2,796,885

DIFFERENTIAL PISTON TYPE RELIEF VALVE

Henry U. Garrett and Clifford M. Peters, Houston, Tex., assignors, by mesne assignments, to U. S. Industries, Inc., a corporation of Delaware Application April 14, 1951, Serial No. 221,038

19 Claims. (Cl. 137—491)

This invention relates to improvements in pressure relief valves and refers more particularly to that class of pressure relief valves of the differential piston type. In another of its aspects, it relates to a relief valve of this general class and to novel pilot means for controlling the same.

This invention is an improvement of the pressure responsive valve of our co-pending applications for United States Letters Patent Serial Number 74,875, filed February 7, 1949, now Patent No. 2,552,892 of May 15, 1951, and Serial Number 164,872, filed May 29, 1950, now Patent No. 2,619,109 of November 25, 1952.

In the construction and operation of pressure systems, it is often desirable to provide pressure relief valves discharging into a common line or header. For example, compressor stations are constructed to have one or more relief valves in service on each compressor with the discharge from each of the valves connected to a common header in order to convey the discharge fluid from the vicinity of the compressors. Upon opening of one of the relief valves, there will be a back pressure impressed on the other valves through the common discharge header.

When the relief valves of such system are of the differential piston type, that is, those valves wherein the seating member is urged into seated position by the application of fluid pressure from the system being protected to a piston connected thereto, the piston having a greater effective pressure area than that of the seating element, the application of a back pressure to such a valve greater that the pressure of the system being protected will act on the piston to open the valve even though it is not desired to do so. Thus, when a compressor is shut down as for repairs, it is necessary to blind off the relief valve in order to prevent it from being opened by back pressure of the other valves of the common system with resultant flooding of the down compressor with relieved pressure fluid. Obviously, the same disadvantage is inherent in other types of relief systems wherein a back pressure is produced by any means whatsoever.

Also, in many of the relief systems wherein a plurality of such class of relief valves discharge into a common discharge line, the high pressure pilot valve, which actuates the main relief valve to cause it to open upon occurrence of a predetermined pressure in the system protected, also discharges into the common discharge line so that any back pressure existing therein disturbs the balance of the pilot valve causing it to tend to become unseated at a lower pressure than intended. Accordingly, such relief valves often tend, under such circumstances, to open prematurely so that the popping of one of the plurality of relief valves causes the others to open even though the pressure in their respective systems is below the set pressure.

An object of this invention is to provide a relief valve of this general class which will remain seated when the pressure within the system to be protected is low or even atmospheric despite the magnitude of any back pressure applied thereto.

Another object of this invention is to provide a valve of this general class with means for preventing a back pressure from unseating the same.

Another object of this invention is to provide a valve of this general class in which back pressure has no substantial effect in seating or unseating the same.

Still another object of this invention is to provide a differential piston-type relief valve adapted to remain in a seated position when back pressure is applied thereto so that the system protected by said valve can be relieved of pressure without danger of said back pressure opening the relief valve.

Yet another object of this invention is to provide a differential piston-type relief valve adapted to be employed to protect a system and to discharge into a common discharge means with one or more other relief valves without the pressure in said discharge means causing said valve to open.

Even another object of this invention is to provide a differential piston-type relief valve having a high pressure pilot means for causing said relief valve to open upon occurrence of a predetermined pressure in the system protected, said means being compensated for back pressures which may be applied thereto.

A further object of this invention is to provide a pilot means adapted to actuate a relief valve upon occurrence of a predetermined pressure in a system protected by said relief valve, said pilot means being so constructed and arranged that upon application of a back pressure thereto the tendency for the pilot means to be actuated thereby is substantially decreased.

A still further object of this invention is to provide a pilot relief means adapted to relieve the pressure in a chamber in a relief valve upon occurrence of a predetermined pressure in the system protected by said relief valve to thereby cause said relief valve to open, the pilot means being further adapted to so relieve despite the application of a back pressure thereto.

A yet further object of this invention is to provide a pilot means adapted to admit a pressure fluid to a chamber of a relief valve to close the same upon the occurrence of a predetermined pressure in the system to be protected, said pilot means being so constructed and arranged that the pressure applied to its seating element is balanced by an equal and opposing pressure.

Other objects, advantages and features of this invention will be apparent to one skilled in the art upon consideration of the written specification, the appended claims and the attached drawings wherein:

Fig. 1 is a partial cross-sectional view of an illustrative embodiment of the relief valve of this invention;

Fig. 2 is a cross-sectional view taken on the line 2—2 of Fig. 1;

Figs. 3 and 3A are enlarged cross-sectional views of a portion of the valve illustrated in Fig. 1;

Fig. 4 is a cross-sectional view taken on the line 4—4 of Fig. 3A; and

Fig. 5 illustrates one application of the valve of this invention.

In the drawings, like characters of reference are used throughout the several views to designate like parts.

Figure 3A:
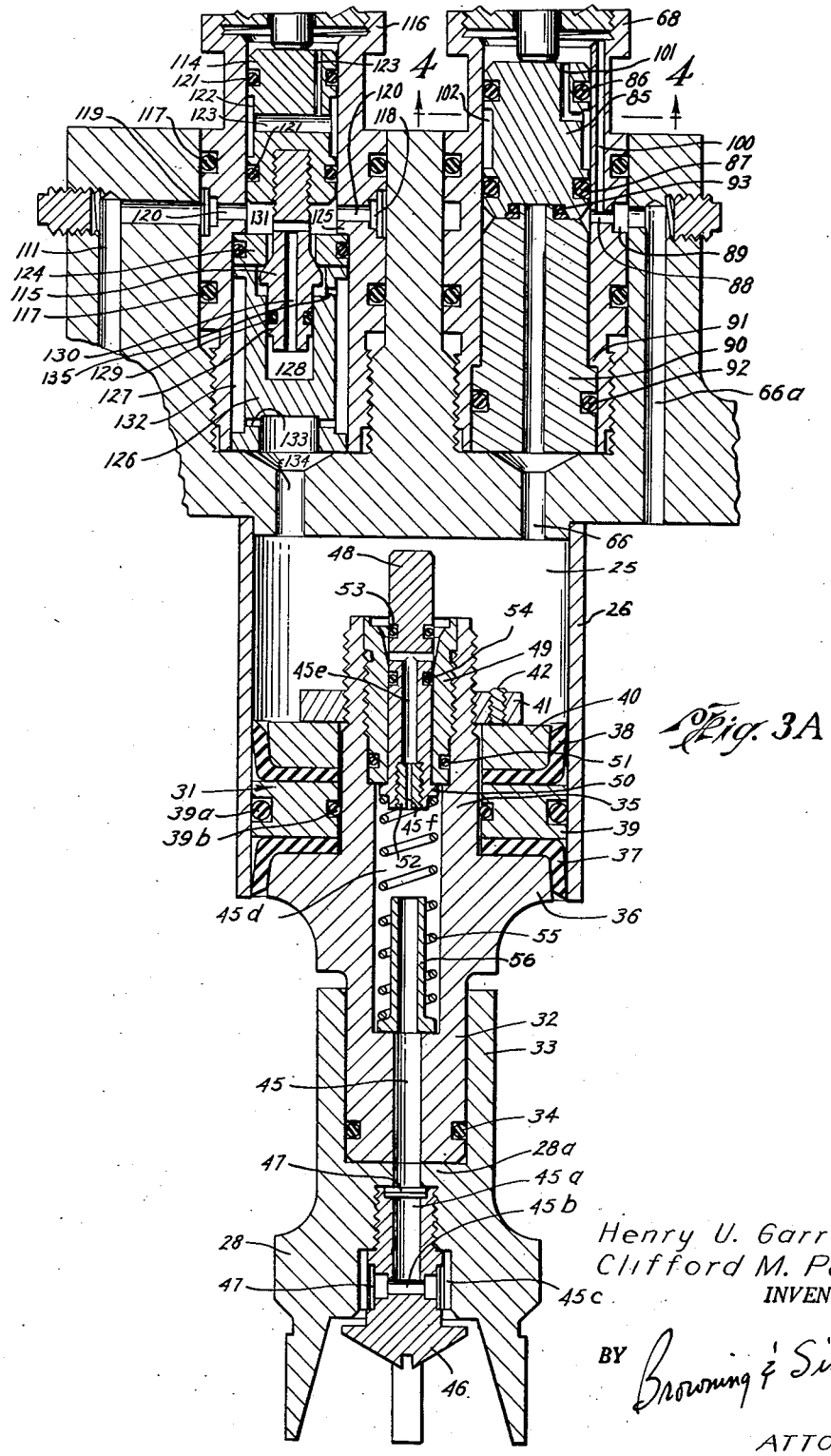

Referring to the drawings, and more particularly to Figs. 1 and 5, the reference numeral 10 designates the relief valve of this invention which can be connected to a conduit or pipe line 11 of a pressure system to be protected. Such conduit can be the discharge line from compressors 12 or other source of pressure fluid, such as a tank, vessel and the like. Relief valves 10 can be connected to a common discharge header 13 by means of conduit stubs 14 so that fluid relieved from the system protected can be conveyed through conduit 13 to a point remote from the systems.

The relief valve of this invention can be connected to a pressure system to be protected, such as conduit 11, by a flanged coupling including flange 15 formed on such conduit and flange 16 formed on the valve 10, with suitable connecting bolts 17 and a gasket 18 sealing the joint between the flanges.

The relief valve comprises a casing 19 and a bonnet 20. The casing is provided with a pressure relief port 21 and an outlet port 22 for discharging fluid from the system protected into, for example, a common discharge conduit such as header 13 to which the valve can be connected by a flanged fitting including flange 23 having bolt holes 24 for receiving bolts extending through corresponding bolt holes in a flange connected to conduit 13. If desired, a suitable gasket can be employed in conjunction with flange 23 to form a fluid tight joint with its companion flange.

The interior of casing 19 includes a chamber 25 which is preferably cylindrical and in axial alignment with the relief port 21. A removable liner 26 can provide the cylindrical surface and this is used for the purpose of providing a readily replaceable wear member.

A seat 27 is provided for relief port 21 and is adapted to receive valve member 28 which engages the seat and is urged therefrom by the pressure within the system whose pressure is to be controlled. Preferably, seat 27 is provided upon a removable element 29 threaded to casing 19 and having a seal element 30 assuring a seal between the seat and the casing.

A pressure responsive means including a pressure responsive member is provided in the casing and is adapted to urge the valve member to a seated position when the pressure in the system protected is below a predetermined value. Such means can comprise a piston 31 residing within the casing and separating chamber 25 from the relief port and outlet port. Piston 31 is slidably received in chamber 25 and is adapted to reciprocate therein towards and away from seat 27.

In accordance with one aspect of this invention, piston 31 is slidably connected with valve member 28 in such a manner that it can move away from said valve member without causing the latter to become unseated and yet can move towards the same to urge it to seated position. A suitable slidably connecting means (shown in detail in Fig. 3A) comprises an extended portion of piston 31 forming a plunger 32 which is preferably cylindrical in cross-section and integral with the piston. Plunger 32 is received in cylinder member 33 attached, preferably integrally, to valve member 28 and so constructed and arranged that plunger 32 is adapted to reciprocate therein and to abut its end against a portion 28a of valve member 28 so that movement of piston 31 towards valve member 28 is limited by such abutment. A seal element, such as O-ring 34, can be provided in a peripheral groove around plunger 32 to provide a seal between the plunger and the cylinder member. In this manner, piston 31 can move away from valve member 28 or seat 27 when a back pressure is applied against the end of piston 31 most removed from chamber 25. On the other hand, when piston 31 moves toward valve member 28, plunger 32 will slide into cylinder member 33 until its end abuts against valve member 28 after which piston 31 and valve member 28 must move as a unit towards the seated position of the valve member.

The piston is comprised of a piston head 35 having an enlarged diameter portion 36 acting as a follower for seal cup 37. A second seal cup 38 is provided and spaced from the first seal cup by cup dividing member 39 with seal elements 39a and 39b, such as O-rings, situated in internal and external peripheral grooves to assure a seal between the cup dividing member and the walls of chamber 25 and the cup dividing member and piston head 35, respectively. An expander washer 40 holds piston cup 38 in expanded position and is secured in place by lock nut 41 having set screw 42 bearing there-against. With this construction, piston 31 is adapted to reciprocate in chamber 25 and yet to form a seal with the walls thereof which prevents fluid flow in either direction past the piston.

Chamber 25 and piston 31 have larger diameters and effective pressure areas than those of seat 27 and valve member 28. Thus, it will be apparent that if pressure within chamber 25 is equalized with that within the system protected, the resultant force due to pressure acting against the piston and valve member will hold the valve member in a closed position with respect to seat 27.

A bleed means is provided for supplying pressure fluid from the system protected, that is, from the pressure relief port upstream of the valve member, to chamber 25 when the valve member is in seated position. This means includes central passage 45 through the valve member-piston unit. One end of passage 45 is provided with a screening means comprising a screen plug 46 adapted to screw into valve member 28 and containing passages 45a and 45b for conducting pressure fluid through the valve member and forming a part of passage 45. Passage 45b communicates with a peripheral passage or counterbore 45c. Screens 47 can be disposed in the inlet and outlet from the passage through plug 46 to prevent foreign material from flowing with the pressure fluid into passage 45.

Means can be provided for closing the bleed means including passage 45 when the piston is moved away from seat 27 and to be particularly effective when valve member 28 moves with piston 31 to unseat the valve member. The closing means comprises a plunger piston 48 slidably received in housing member 49 and having a shoulder 50 adapted to bear against the lower end thereof. Housing member 49 can be threaded into the discharge end of passage 45d in piston head 35 with seal element 51 received in a peripheral groove therearound to afford a seal between the housing member and the piston head. Plunger piston 48 has a central passageway 45e with laterally extending end ports opening into a tapered counterbore in the end of housing member 49. A choke 52 having a restricted passageway 45f can be screwed into one end of plunger 48 to restrict flow therethrough. Sealing elements 53 and 54 can be received around plunger 48 above and below, respectively, the laterally extending end ports to provide a sliding seal with the housing member. Thus, when piston 31 is advanced into the chamber 25, the end of plunger 48 will bear against bonnet 20 and be pushed into housing member 49 until the laterally extending end ports and sealing element 53 enter the bore of member 49 and then sealing element 53 forms a seal with the walls of such bore to effectively stop the flow of pressure fluid through passageway 45 into chamber 25. On the other hand, when piston 31 moves outwardly from chamber 25 to urge valve member 28 to a seated position and into a position illustrated in Fig. 3A, plunger 48 will be urged outwardly from housing 49 by spring 55 bearing against hollow retainer 56 thereby re-establishing a communication between the interior of chamber 25 and the pressure system protected. However, the flow capacity of passage 45f is so small that the pressure slowly bleeds into chamber 25.

It is believed apparent that with the valve in the position illustrated in Figs. 1 and 3A, the pressure from the system being protected will bleed through passage 45 into chamber 25 until the pressure therein is equalized with respect to the pressure in the system being protected. While such pressures are equalized, valve member 28 will always be urged to a seated position due to the force afforded by the greater effective pressure area of piston 31 acting downwardly to seat the valve in opposition to the force afforded by the lesser effective pressure area of valve member 28 acting upwardly to unseat the valve. Further, it is believed to be apparent that a back pressure applied through outlet port 22 against piston 31 and valve member 28 cannot cause the valve member to become unseated because even when the back pressure becomes greater than that of the system protected by the valve, piston 31 would merely move into chamber 25 drawing plunger 32 out of cylinder member 33, thereby permitting valve member 28 to remain in a seated position.

In order to unbalance the forces due to pressure acting on piston 31 and valve member 28, upon occurrence of a predetermined maximum pressure within the system protected, in a manner to cause opening of the relief valve, a high pressure pilot relief means is provided for relieving the pressure within chamber 25. The pilot means is of a self-closing snap action type and preferably is of such type as will remain open for a definite time period sufficient to provide relief of the pressure within chamber 25. This pilot relief means is shown generally at 65 in Fig. 1.

A novel pilot relief valve has been provided for this purpose and is preferred, but it is to be understood that other pilot relief valves of this general class can be employed with reasonably satisfactory results.

The novel preferred high pressure pilot valve controls the relief port 66 in bonnet 20. The capacity of relief port 66 is much greater than that of restricted passage 45f so that the pressure within chamber 25 is quickly vented when port 66 is opened. Port 66 has a portion 66a that communicates with a passage 67 formed in casing 19 and this in turn communicates with the discharge conduit connected to outlet port 22 of the relief valve.

The pilot valve resides in an enlarged portion of port 66 and comprises a fitting 68 threaded into the bonnet. The upper portion of the pilot valve is shown in Fig. 3. It is to be understood that this upper portion is the same as that for low pressure pilot valve 110, except for one detail noted below, and in the interest of simplicity, these portions will be described only once and are shown in full in Fig. 3 only for pilot valve 110.

Fitting 68 carries at its outer end a housing 69 with an adjusting screw nut 70 threadedly received therein. A lock nut 71 secures adjusting nut 70 in its proper position. Hood 72 can be threaded to the upper portion of adjusting nut 70 and surmounted with a cap 73 to prevent dirt and other foreign material from entering the pilot valve. A valve stem 74 extends through nut 70 and is pressed downwardly by control spring 75 which engages guide 76 on stem 74. The other end of spring 75 bears against a thrust bearing 77 abutting nut 70 and having bearing members 78 received between itself and spring retainer 79. In this manner, nut 70 can be screwed into and out of housing 69 without applying any substantial rotative stress to spring 75. The lower end of stem 74 passes through a reduced diameter opening in the lower end of housing 69 and, for the high pressure pilot valve only, is sealed therefrom by a suitable sliding seal such as O-ring 80 residing in a peripheral groove formed in the housing. An O-ring seal 81 can be disposed in the high pressure pilot valve to seal between housing 69 and fitting 68. The end of the valve stem bears against a relief valve piston 85 having a sliding seal with the bore of fitting 68. This seal may be of the O-ring type with seal elements 86 and 87 disposed in peripheral grooves at the upper and lower ends of the piston, respectively.

Fitting 68 has lateral opening 88 communicating between the interior of the fitting and a peripheral groove 89 which in turn communicates with the portion 66a of the vent passage. This passage is controlled by the relief valve piston 85 seating over a boss on the upper end of seat member 90. Seat member 90 is maintained in a fixed position in the bonnet by a shoulder 91 on fitting 68 and bearing against a corresponding shoulder on member 90. A suitable sealing means such as O-ring 92 can be provided to effect a seal between member 90 and fitting 68. Relief vent 66 continues upwardly through member 90 and discharges centrally of the boss at the upper end of the member. Disposed around the boss is a suitable sealing means for effecting a seal between piston 85 and member 90. This can comprise an O-ring type seal 93 received around the boss and adapted to be pressed in sealing relationship between the member 90 and piston 85 when the latter is seated across the boss to prevent fluid escaping from vent 66 into passage 88.

This arrangement is such that the pressure within chamber 25 is active through vent 66 against that portion of the lower end of piston 85 contained within sealing means 93. The tension of spring 75 is adjusted by means of nut 70 to be such that when a predetermined pressure exists in the system protected and hence in chamber 25, piston 85 will be forced upwardly to crack the same from its seat on member 90. When this occurs, the effective pressure area of piston 85 is greatly increased, that is, the area becomes that of the internal bore of fitting 68 so that piston 85 is pushed with a snap-action even further away from member 90, thereby permitting pressure fluid to escape from chamber 25 through passages 88 and 66a to a point downstream of the relief valve. With piston 85 in such position, the pressure within chamber 25 is substantially blown down to permit piston 31 to move thereinto due to the pressure of the system protected acting against valve member 28 and thereby urging the piston into such position. It is noted that the blowing down can occur because the capacity of vent 66 is much greater than that of restricted passage 45f. When valve member 28 has been moved from its seat and piston 31 has been pushed into chamber 25, the bleed means for supplying pressure fluid to chamber 25 is closed because the movement of piston 31 into the chamber causes plunger 48 to abut against the bonnet and be forced into the piston, thereby blocking off the bleed passage contained therein due to the sealing effect of sealing means 53 against housing member 49. Thus, when pilot relief means 65 recloses, the pressure within chamber 25 will not build up so that the relief valve will remain open until the pressure with chamber 25 is built up by a supplementary means. The admission of pressure fluid to chamber 25, so as to reclose the main relief member 28, is controlled by a low pressure pilot means shown generally at 110.

It is a feature of this invention that any back pressure acting from the discharge side of the relief valve via passages 67 and 66a and thence against the lower end of piston 85 is prevented from aiding the fluid pressure of chamber 25 in unseating piston 85 from its seat, thereby opening the relief valve at a pressure lower than its set pressure. This is effected by providing a means for applying any back pressure in passage 66a to the other side of piston 85. Thus, passage 100 can be provided to communicate with passage 66a and the upper side of piston 85 so that the back pressure will exert substantially no net force tending to move the piston, and will not cause an opening thereof by acting solely on the lower face of the piston to augment the force being applied thereto by the pressure fluid from vent 66. It is to be noted in this connection that the effective pressure area of the back pressure fluid acting in opposition to spring 75 on valve stem 74, i. e. that contained within sealing means 80, is substantially equal to that contained within sealing means 93 so that although the effective pressure area of the upper end of piston 85 with respect to the back pressure applied thereto is greater than the effective pressure area for such pressure at the lower end of piston 85, the effect of such excess of pressure area will be balanced out by the back pressure acting upwardly against valve stem 74 to decrease the downward force of spring 75 by an amount equal to that effected by said difference.

An additional passageway 101 can be provided to communicate with a peripheral groove 102 extending between sealing elements 86 and 87 to prevent entrapment of fluid therebetween which would deleteriously affect their sealing function.

Low pressure pilot valve 110 controls a passage 111 which can communicate with the pressure system to be controlled at any desired point as, for instance, by means of hollow fitting 112 sealably mounted with bonnet 20 and flange 16 and providing communication with passage 113 opening into the interior of casing 19 below valve seat 27.

The low pressure pilot means includes a piston 114 and a valve element 115. The piston is urged into a central bore of a fitting 116 by a valve stem 74 having an adjustable biasing means 75 co-acting therewith and having other elements as shown in Fig. 3 and described with respect to the high pressure pilot relief means above. As stated, that portion of the low pressure pilot and the high pressure pilot means shown in Fig. 3 are identical in construction except as noted above and a description thereof is not repeated here in the interest of simplicity.

Piston 114 is exposed to the pressure from passage 111 so that the force of the pressure acting against the piston opposes the compression spring acting in an opposite direction through the valve stem. Thus, when the pressure within passage 111, which it will be remembered is a pressure within the system protected, falls below a predetermined value, the spring 75 will move piston 114 downwardly to unseat valve element 115.

The detailed construction of the low pressure pilot relief means includes a fitting 116 screwed into bonnet 112 and having O-rings 117 sealing between fitting 116 and bonnet 20 both above and below passage 111. A peripheral groove 118 can be disposed around fitting 116 with a screen 119 co-extensive therewith to provide communication between passage 111 and passages 120, thereby permitting pressure fluid from the system protected to flow into the interior bore of fitting 116.

Piston 114 is slidably received in fitting 116 and is provided with sealing means such as O-rings 121 disposed in suitable peripheral grooves. Another peripheral groove 122 can be situated around piston 114 between O-rings 121 and have communicating passageways 123 opening onto the upper side of the piston to thereby communicate with atmospheric pressure existing within housing 69 by virtue of opening 69a therein. Such bleed off means prevent any substantial accumulation of pressure fluid between O-ring seals 121 and therefore, permit the seals to better perform their sealing function.

Valve element 115 is threadedly dependent from piston 114 and has an enlarged diameter section seating against an insert seat 124 held in place against a shoulder 125 of fitting 116 by member 126. Valve element 115 has its end downstream of its seat formed into a piston or plunger 127 reciprocally received in a corresponding cylindrical portion 128 of member 126 and maintained in sealed relationship therewith by a sealing element such as O-ring seal 129 received in the plunger. The effective pressure area of this plunger is equal to that of valve element 115 across its seat. Communicating with cylinder 128 is a passage 130 having laterally extending ports opening into the pressure fluid chamber 131. In this manner, the force exerted by the pressure fluid in chamber 131 on the valve element 115 over the effective pressure area of its seat is counterbalanced by fluid under the same pressure acting through passage 130 against the plunger 127 so that the pressure of the fluid in the system protected does not have any net actuating force on valve element 115 across its seat. It is belived apparent that this feature of the invention will permit the pressure of the fluid in the system being protected to actuate the low pressure relief means by acting solely on the effective pressure area of piston 114 since the pressure effect of such fluid on valve element 115 is effectively balanced out by the plunger structure of such valve.

Fitting 116 is provided with peripheral passage 132 communicating via passageway 133 with passage 134 and hence, into chamber 25. A restricted passage 135 is provided between the chamber downstream of the valve seat and passage 132 so that upon unseating of the valve element, pressure fluid can flow from passage 111 across the valve seat and out restricted passage 135 and hence into chamber 25 to again repressure the chamber and force piston 31 outwardly therefrom to reseat valve element 28, thereby effectively closing the relief valve upon the occurrence of a predetermined lower pressure in the system being protected.

The purpose in providing passage 135 as a restricted flow area is to permit manual testing of the relief valve. Thus, when the system being protected is temporarily at a pressure below that at which the low pressure pilot valve is set to open and it is desired to test the relief valve to determine whether it is operating properly, valve stem 74 of the high pressure pilot valve can be lifted manually to permit the pressure in chamber 25 to be vented in order to unseat valve member 28 from its seat 27. With restricted passage 135, the repressuring fluid from passage 111 cannot flow into cylinder 25 at a rate sufficiently high to prevent piston 31 from rising therein. Hence, the operation of the relief valve can be satisfactorily tested even though the pressure in the system being protected is below the set pressure of the low pressure pilot valve. In this connection, it should be noted, as shown in Fig. 2, that a manual blow down means comprising passage 140 communicating with chamber 25 can be provided in the valve bonnet and controlled by a valve 141 to permit blowing down of chamber 25 whenever desired without necessitating hand operation of the high pressure pilot valve.

Operation of this low pressure relief pilot means is believed apparent. With valve element 115 seated, the pressure from the pressure system protected is active against the area of piston 114 thereby urging it upwardly against spring 75. It is to be noted that the pressure acting against the valve member over the area of the member seated in seat 124 is effectively counterbalanced by the same pressure acting in an opposite direction against the end of plunger 127 which is of equal area to that contained in the valve seat. Therefore, the seating and unseating of the valve element 115 is independent of the pressure existing in chamber 25 and hence, in the chamber below the valve seat. When the force due to the pressure acting against the end of piston 114 falls below that of the spring 75, the spring forces piston 114 downwardly to unseat the valve element. Plunger 127 is still exposed to the same pressure as exists in chamber 131 so that unseating of the valve element does not disturb the balance of forces due to unseating of the valve. Whenever the pressure within the pressure system protected rises above a predetermined value valve element 115 will be reseated.

It is believed that the operation of the various parts of the relief valve of this invention is apparent from the foregoing description. However, a brief description of the operation of the relief valve as a whole will be given to insure complete disclosure of the invention.

The relief valve may be mounted upon any pressure system to be protected and is particularly adapted to be mounted to discharge with one or more other relief valves into a common discharge header without having the back pressure effected by opening of the other relief valves causing irregularities in the operation of the relief valve. When so mounted, the pressure of the system protected is active against the area of valve member 28 which is enclosed within seat 27 urging the valve member toward unseated position. However, this same pressure bleeds through passages 45 and 45f into chamber 25 and is active against the relatively large area of piston 31 in a direction to seat the valve member 28.

As long as the pressure within the system protected is below the selected safe maximum, the relief valve member 28 will remain closed. However, when this pressure exceeds the selected maximum, the high pressure pilot valve 65 is opened and quickly effects a reduction of the pressure within chamber 25 so that the pressure acting against the valve member 28 causes the valve member to rise against the forces acting against piston 31 in the opposing direction. When the valve member is in open position, the bleed port opening from passage 45e is closed off so that the pressure within chamber 25 remains relieved until the pressure within the system protected falls below a predetermined lower limit. When this occurs, the low pressure pilot valve 110 is opened to supply pressure fluid to chamber 25. This pressure fluid is substantially the same as that acting against the valve member 28 to hold it open and, being effective against a greater area than the area of the valve member 28, the valve member is forced to a closed position. As soon as the pressure within the system protected builds up above the lower limit, low pressure pilot valve 110 will close. It will be appreciated, however, that if at any time the pressure within the system protected falls below the predetermined low limit so that pilot valve 110 opens, this will not have any effect upon the relief valve 28 but that it will remain closed.

When a back pressure is applied through outlet port 22 to the relief valve of this invention, the latter's operation will be substantially uneffected. Thus, should a plurality of relief valves be connected to a plurality of pressure systems to be protected as shown in Fig. 5, the relief of pressure from any one of the systems will not substantially effect the operation of the relief valves protecting the other systems. For example, if the systems protected comprise compressors and one of the compressors is shut down so that the pressure throughout the relief valve protecting that system falls to atmospheric, the opening of one or more of the other relief valves operating on systems which have not been shut down will not cause the relief valve of the system which has been shut down to fly into an open position due to the back pressure applied thereto. Specifically, if the valve shown in Fig. 1 is mounted on a system whose pressure is substantially atmospheric and a pressure be applied through outlet port 22, the effect of that pressure would be to move piston 31 away from valve seat 27, thereby causing plunger 32 to withdraw with respect to cylinder member 33 so that piston 31 in such instance is free to move without unseating valve member 28. It is believed apparent that such back pressure acting upon valve member 28 would cause it to seat and remain seated since such back pressure is in excess of the pressure applied to the valve member across the seat 27 through pressure relief port 21. Hence, when the pressure system being protected is at a pressure lower than that existing in the common discharge line 13, the relief valve will not be opened and, on the contrary, the back pressure will cause the valve member 28 to be urged to its seat while withdrawing piston 31 with respect thereto.

The novel construction of the high pressure pilot valve through which the effect of back pressures impressed thereon is eliminated and the novel construction of the low pressure pilot relief valve through which the effect of variations of pressure in the chamber 25 on the operation thereof is eliminated affords a relief valve which is adapted to have very close-set relief and closing pressures. When the valve of this invention is employed to protect a pipe line having a safe maximum pressure of 770 p. s. i., it can be set to open at 760 p. s. i. and to close at 740 p. s. i., thereby providing a very narrow operating range with resultant economies of operation. The advantage of this close-set operation will be even more apparent when it is remembered that many other types of relief valves must be set to open at a pressure which is substantially below, say, 50 p. s. i. in the example given above, the same maximum pressure of the line in order to insure that the line will be adequately protected. Thus, the operating pressure of a line may be as much as 40 p. s. i. above that of said other types of relief valves and still afford the same degree of protection.

Another advantage of the valve of this invention is that there is no necessity for permitting escape of fluids across the main valve seat into a so-called "huddling" chamber, as in many other types of valves, in order to effect an operation thereof. Accordingly, there is no opportunity for such gases to erode the seat of the valve by their constant passage therethrough.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope theerof, it is to be understood that all matter herein set forth or shown in the accompanying drawings is to be interpreted as illustrative and not in a limiting sense.

The invention having been described, what is claimed is:

1. In a pressure relief valve wherein there is provided a fluid inlet and outlet, a valve member held in seated position by a pressure responsive means having first and second opposing pressure surfaces, a fluid passageway normally placing the first surface in fluid communication with a pressure to move the pressure responsive means in a direction to urge the valve member toward seated position, a fluid passageway placing said second surface in fluid communication with said outlet, the valve member likewise having first and second opposing pressure surfaces with the first surface of the valve member being exposed to the inlet so that inlet pressure urges the valve member toward unseated position and the second surface of the valve member being exposed to the outlet so that outlet pressure urges the valve member toward seated position, the improvement which comprises in combination therewith of a lost motion connection between said valve member and said pressure responsive means, said connection allowing said pressure responsive means to move responsive to pressure applied to said second surface of the pressure responsive means without unseating said valve member and yet, upon predetermined movement of the pressure responsive means responsive to pressure applied to said first surface of the pressure responsive means, to form a force transmitting connection with said valve member to urge it to seated position.

2. The valve of claim 1 wherein said lost motion connection comprises a connecting member attached to said pressure responsive means and having a sliding connection with said valve member, said connecting member being adapted to abut against said valve member so that said pressure responsive means can urge the valve member to a seated position.

3. The valve of claim 1 wherein said lost motion connection comprises a plunger slidably received in a cylinder member and having a limited path of travel therein.

4. In a pressure relief valve of the type having an inlet and outlet, a valve member and actuating piston of differential areas with means for bleeding pressure fluid to be controlled to the back end of the piston to hold the valve member closed and means for relieving the pressure in back of the piston upon occurrence of a predetermined maximum pressure in the system protected, said piston having its end opposite said back end in fluid communication with said outlet so that pressure at said outlet tends to move the piston away from the valve member, the improvement which resides in the combination therewith of a slidable connection between said valve member and said piston to permit said piston to move away from said valve member without unseating the latter upon occurrence of a predetermined pressure at said outlet, and yet to move toward said valve member to urge it to its seat.

5. In a pressure relief valve, a casing with a relief port and a discharge port, a valve member controlling the relief port, said valve member being situated so that the pressure to be controlled acts to urge it from its seat and pressure fluid from said discharge port urges it toward its seat, a pressure responsive means for holding the valve member in closed position when the pressure to be controlled is at a predetermined value comprising a chamber and a pressure responsive member forming one wall of said chamber, said pressure responsive member having its side opposite said chamber in fluid communication with said discharge port, means slidably connecting said valve member and said pressure responsive member so that the latter can move away from said valve member but can move towards the same to bear thereagainst, bleed means for supplying pressure fluid to be controlled to the chamber behind said pressure responsive member, and separate means for controlling the pressure in said chamber responsive to the pressure to be controlled.

6. The relief valve of claim 5 wherein said separate means for controlling the pressure in said chamber comprises a high pressure pilot means adapted to relieve the pressure within said chamber upon occurrence of a predetermined high pressure of the fluid acting against said valve member; and a separate pilot means adapted to supply pressure fluid to the chamber and against said pressure responsive member upon occurrence of a predetermined low pressure of the fluid acting against said valve member.

7. In a pressure relief valve, a casing with a relief port and a discharge port, a valve member controlling the relief port, said valve member being situated so that the pressure to be controlled acts to urge it from its seat, a chamber within the casing and a piston reciprocally mounted in the chamber, the end of the piston remote from said chamber being in fluid communication with said discharge port, a slidable connection between said valve member and said piston so that the latter can move away from said valve member without movement of said valve member but can move towards the valve member a predetermined distance and then establish a force transmitting connection with the valve member to urge it to its seat, bleed means for supplying pressure fluid to be controlled ot the chamber behind said piston when the valve member is seated, and separate means for controlling the pressure in said chamber responsive to the pressure to be controlled.

8. In a pressure relief valve, a casing with a relief port, a discharge port, and a pressure chamber separate from said ports; a valve member controlling the relief port, said valve member being situated so that the pressure to be controlled acts to urge it from its seat; a pressure responsive member of greater effective pressure area than that of the valve member and separating the chamber from the relief and outlet ports and having an effective pressure area exposed to said outlet port; a slidable connection between said valve member and said pressure responsive member comprising a plunger and a cylinder member for receiving the same so that the pressure responsive member can move away from said valve member without unseating the latter but can move towards the valve member to urge it to its seat; bleed means for supplying pressure fluid from the pressure system to be controlled to said chamber; and separate means for controlling the pressure in said chamber responsive to the pressure to be controlled.

9. In a pressure relief valve, a casing with a relief port and a discharge port, a valve member adapted to seat in said casing to prevent flow of fluid whose pressure is to be controlled therethrough, means adapted to move responsive to the pressure differential thereacross towards and away from a seat for said valve member, means providing fluid communication between one side of said pressure responsive means and said discharge port, means slidably connecting said pressure responsive means and said valve member so that the pressure responsive means can move away from said valve member without unseating the valve member but can move towards the valve member to bear thereagainst to urge it to a seated position and means for controlling the pressure on the other side of said pressure responsive means to maintain said valve member seated when the pressure to be controlled is below a predetermined maximum and to permit said valve member to become unseated when the pressure exceeds said maximum.

10. In a pressure relief valve, a casing having a piston reciprocally received in a pressure chamber and having a relief port axially aligned with the chamber but of smaller diameter; an outlet port between said relief port and chamber; a valve member adapted to seat in said relief port; a slidable connection between said piston and said valve member adapted to permit the piston to move away from the valve member without causing the latter to become unseated from its seat in said casing and yet to move towards the valve member to urge the latter to a seated position, means providing a fluid passage communicating between the chamber on the side of the piston remote from the valve member and the relief port upstream from the valve member; means for closing said passage when said piston moves into said chamber; a first pilot means adapted to relieve the pressure within the chamber upon occurrence of a predetermined pressure; and separate pilot means adapted to supply pressure fluid to the chamber in back of the piston upon occurrence of a predetermined pressure within the system controlled by the relief valve.

11. In a pressure relief valve, the combination which comprises, a casing having a relief and a discharge port, a valve member adapted to seat in said casing, a chamber, a pressure responsive means exposed to said chamber for holding the valve member in seated position, bleed means for supplying pressure fluid to said chamber to urge the pressure responsive means in a direction to seat the valve member, and pilot means for relieving the pressure in said chamber comprising a housing having an inlet passage from said chamber and an outlet passage communicating with said discharge port, a piston reciprocally received in said housing, a rod having a sliding seal with said housing and abutting one end of said piston, means for biasing said rod to urge the piston to seat across said inlet passage, said piston being adapted to be unseated to permit fluid flow out said outlet passage, the cross-sectional area of said rod within said sliding seal being substantially equal to the area of said piston within its seat across said inlet passage, said piston having a cross-sectional area greater than that of the inlet passage, and means providing a passage between said outlet passage and the end of said piston more remote from the seating end thereof so that any back pressure applied through said outlet passage to said seating end will also be applied to said remote end.

12. The valve of claim 11 in combination with means for closing said bleed means when the pressure is relieved from said pressure responsive means and a second pilot means adapted to supply pressure fluid to said pressure responsive means to seat said valve member upon occurrence of a predetermined pressure in the system controlled by the relief valve.

13. In a pressure relief valve for controlling a pressure system, a casing having a pressure relief port and an outlet port, a valve member adapted to seat in said casing and connected to a pressure responsive means, bleed means for supplying pressure fluid to said pressure responsive means to urge said valve member to a seated position, first pilot means for relieving the pressure in said pressure responsive means upon occurrence of a predetermined pressure in the system controlled and second pilot means for admitting pressure fluid to said pressure responsive means when said system is at a predetermined pressure comprising a housing having an outlet communication to said pressure responsive means and an inlet, a valve seat intermediate said inlet and outlet, a piston reciprocally received in said housing upstream of said seat, a valve element connected to said piston and adapted to be urged into said valve seat by pressure applied to said piston, a plunger slidably received in said housing and attached to said seat element, means providing a passage from the upstream side of said seat to the end of said plunger so that pressure applied to the latter acts to oppose the upstream pressure acting against said valve element across its seat and means biasing said valve element so that a predetermined pressure must be applied upstream of said seat before said valve will open.

14. The apparatus of claim 13 wherein said first pilot means comprises a piston slidably received in a housing and adapted to seat across a passage of lesser cross-sectional area communicating with said pressure responsive means, means biasing said piston to a seated position, said housing having an outlet adjacent to the terminus of said passage across which said piston seats and means providing a passage communicating with said outlet and the interior of said housing on the end of said piston opposite its seating end so that a back pressure applied to said first pilot means will be effective against opposite ends of said piston.

15. The apparatus of claim 14 wherein said biasing means includes a shaft bearing against the end of said piston opposite from its seating end and having a sliding seal with said housing, said shaft having an effective cross-sectional area equal to that of the seating end of said piston contained within its seating portion so that the unbalancing effect of back pressure on said piston is substantially eliminated.

16. The apparatus of claim 15 wherein said pressure responsive means comprises a piston received in a chamber in said casing and wherein the connection between said piston and said valve member is comprised of a slidable connection adapted to permit said piston to move away from said valve member and yet to urge the latter to its seat upon movement towards the valve member.

17. The apparatus of claim 16 wherein said slidable connection comprises a plunger received in a cylinder member, the plunger being adapted to abut against said cylinder member to afford only limited movement thereinto.

18. As a subcombination, a high pressure pilot valve adapted to relieve pressure within a pressure conduit which comprises a housing having a cylinder therein and an inlet passage opening into said cylinder and adapted to communicate with said conduit, piston means mounted for reciprocation in said cylinder and having a first endwise surface a portion of which is seatable across said inlet passage to block flow therethrough into said cylinder, said piston means having a sufficiently close fit with said cylinder to substantially prevent flow therebetween, said housing having a discharge opening therefrom to permit escape of fluid from the cylinder when said piston is unseated, means biasing said piston toward seated position, and means providing a passageway communicating with said discharge opening and a second endwise surface on said piston means disposed oppositely from said first endwise surface whereby back pressure applied to said pilot valve will be effective against both ends of said piston, said biasing means including a valve stem co-acting with said piston means, said stem extending through said housing in a sliding sealed relationship and having an effective pressure area substantially equal to that of said first endwise surface portion of said piston means seatable across said inlet passage.

19. As a subcombination, a low pressure pilot valve adapted to admit a fluid from an external source into a pressure chamber which comprises, a housing having an inlet and a bore and a valve seat disposed around the bore, a piston reciprocally received in said bore, means biasing said piston towards said seat, said piston having an end in fluid communication with said inlet so that pressure applied to said end opposes said biasing means, a valve element connected to said piston and disposed to be urged from said seat by the biasing means acting on said piston, a plunger attached to and on the side of said valve element opposite said piston, a cylinder in said housing and reciprocally receiving said plunger, the cross-sectional area of said valve element across its seat being substantially equal to that of said plunger, a passage communicating between said cylinder and said housing upstream of said seat, the seat and plunger being so arranged that the upstream pressure acting against said valve element across said seat opposes that acting against said plunger within said cylinder, and outlet means from said housing downstream of said seat.

References Cited in the file of this patent

UNITED STATES PATENTS

| | | |
|---|---|---|
| 314,649 | Campbell | Mar. 31, 1885 |
| 595,061 | Gulland | Dec. 7, 1897 |
| 815,912 | Eddy | Mar. 20, 1906 |
| 934,083 | Mills | Sept. 14, 1909 |
| 1,321,527 | Hitze | Nov. 11, 1919 |
| 1,830,927 | Campbell | Nov. 10, 1931 |
| 1,901,119 | Putnam | Mar. 14, 1933 |
| 1,965,307 | Darling | July 3, 1934 |
| 2,214,963 | Jurs | Sept 17, 1940 |
| 2,351,871 | Parker | June 20, 1944 |
| 2,566,772 | Ottis | Sept. 4, 1951 |